United States Patent [19]

Orain

[11] Patent Number: 4,689,035
[45] Date of Patent: Aug. 25, 1987

[54] HOMOKINETIC VERY FREELY SLIDING JOINT IN PARTICULAR FOR OPERATING AT HIGH SPEED

[75] Inventor: Michel A. Orain, Conflans Sainte Honorine, France

[73] Assignee: Uni-Cardan Aktiengesellschaft, Siegburg, Fed. Rep. of Germany

[21] Appl. No.: 752,291

[22] Filed: Jun. 28, 1985

[30] Foreign Application Priority Data

Jul. 2, 1984 [FR] France .................................. 84 10473
Mar. 21, 1985 [FR] France .................................. 85 04217

[51] Int. Cl.⁴ ........................... F16D 3/20; F16D 3/26
[52] U.S. Cl. ..................................... 464/124; 464/109; 464/118; 464/905
[58] Field of Search ............... 464/109, 111, 112, 120, 464/122, 123, 124, 905, 117, 118

[56] References Cited

U.S. PATENT DOCUMENTS

| | | | |
|---|---|---|---|
| 952,413 | 3/1910 | Breed | 464/122 |
| 2,670,614 | 3/1954 | Wildhaber | 464/124 |
| 2,777,306 | 1/1957 | Wildhaber | 464/905 X |
| 3,621,676 | 11/1971 | Shachter | 464/123 X |
| 4,487,592 | 12/1984 | Sindelar | 464/123 |

FOREIGN PATENT DOCUMENTS

| | | |
|---|---|---|
| 602174 | 8/1934 | Fed. Rep. of Germany . |
| 904256 | 12/1953 | Fed. Rep. of Germany ...... 464/124 |
| 2523236 | 9/1983 | France . |
| 2525306 | 10/1983 | France . |
| 250987 | 7/1948 | Switzerland . |

*Primary Examiner*—Daniel P. Stodola
*Attorney, Agent, or Firm*—Wenderoth, Lind & Ponack

[57] ABSTRACT

A joint which includes a barrel (1) in which are pivotally mounted four channels (3) defining rolling tracks (5) having a circular cross-sectional shape, adjacent channels defining mutually engaged teeth (7). Received in these rolling tracks are rollers (12) of spherical shape rotatively and slidably mounted on trunnions (11) connected to a shaft (8). Such a joint has, for a given overall size, a torque-transmitting capacity much higher than that of a universal joint and can slide very freely while transmitting torque. It is moreover homokinetic, silent and of relatively low constructional cost, and has application in particular to motor vehicle transmissions.

27 Claims, 29 Drawing Figures

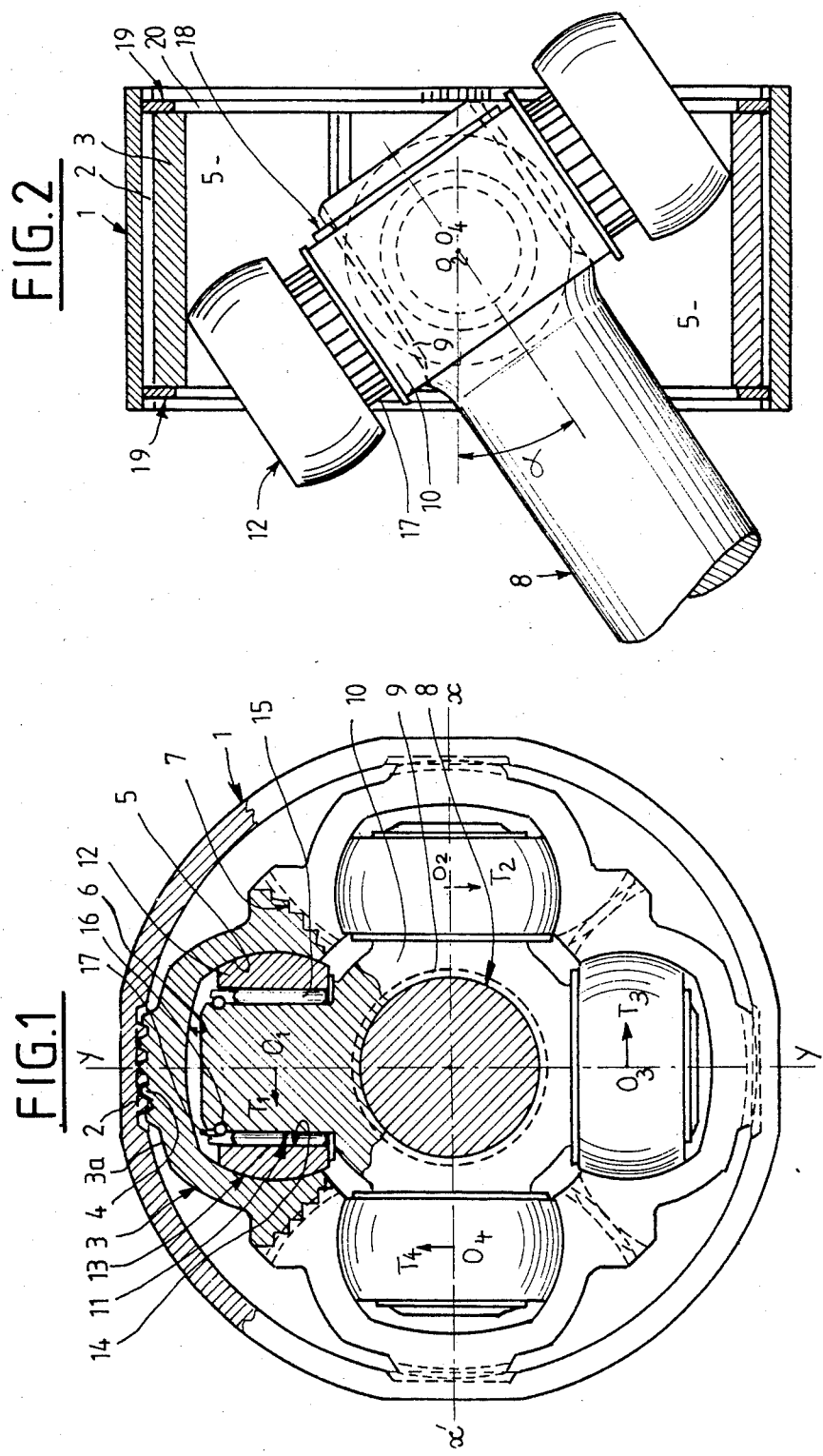

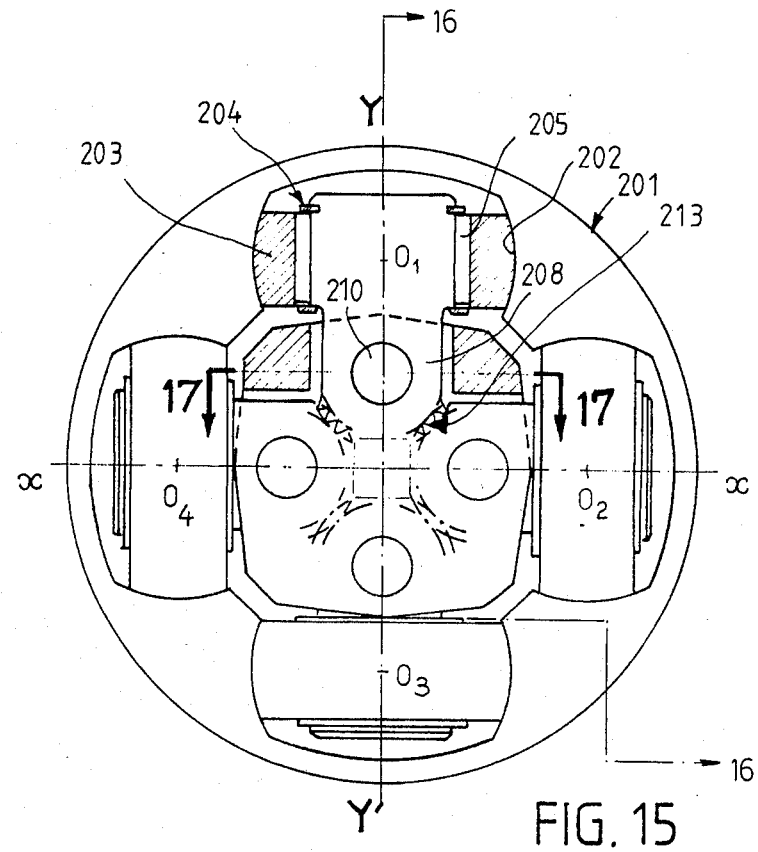
FIG. 15
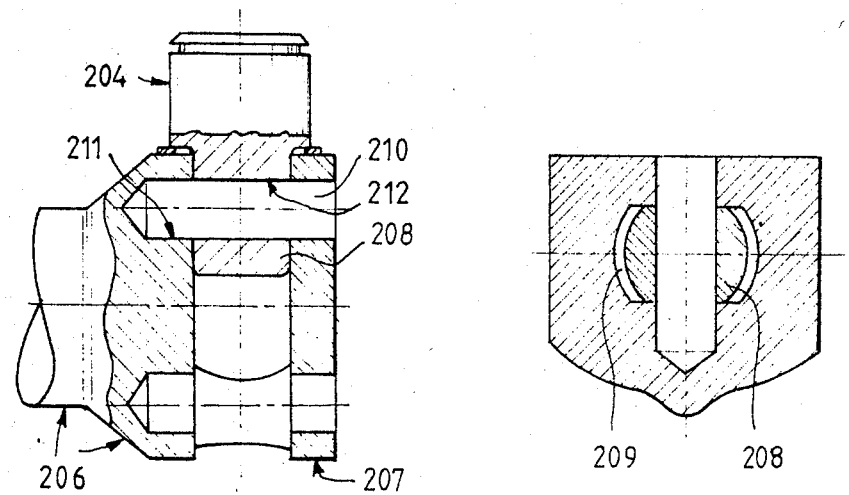
FIG. 16
FIG. 17

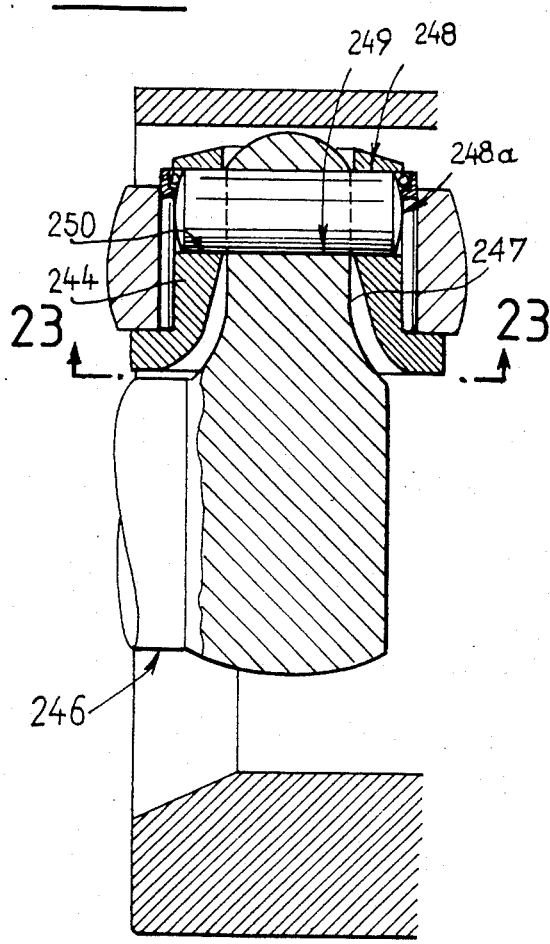
FIG.21
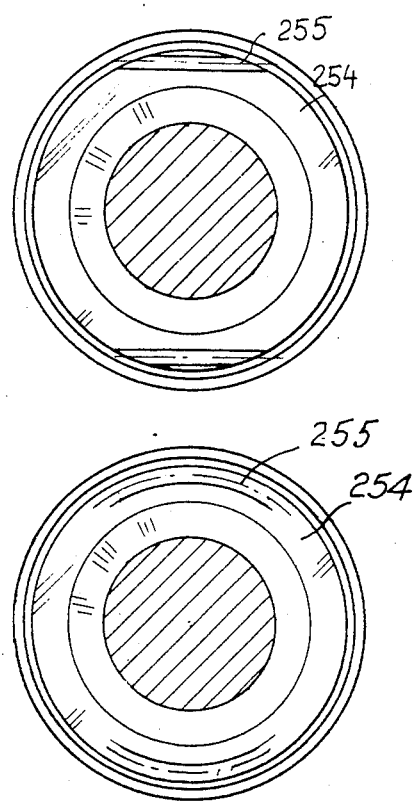
FIG.23
FIG.24
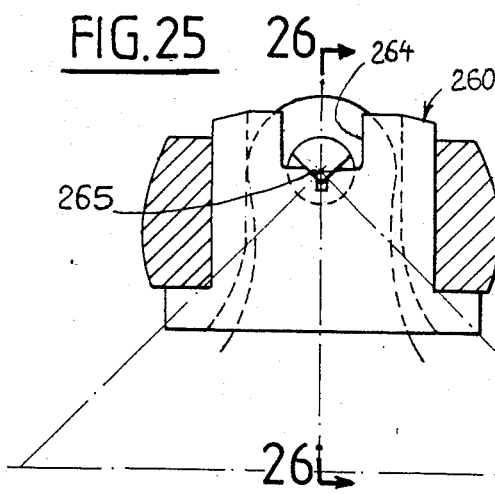
FIG.25
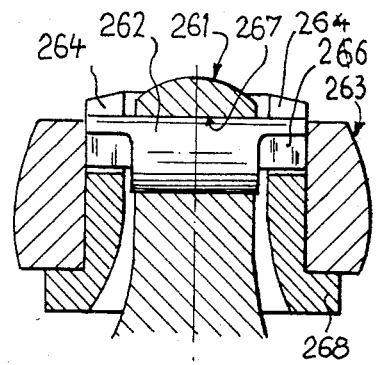
FIG.26

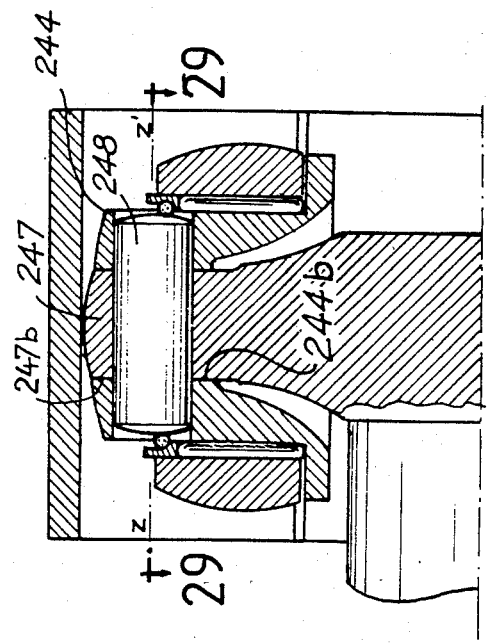
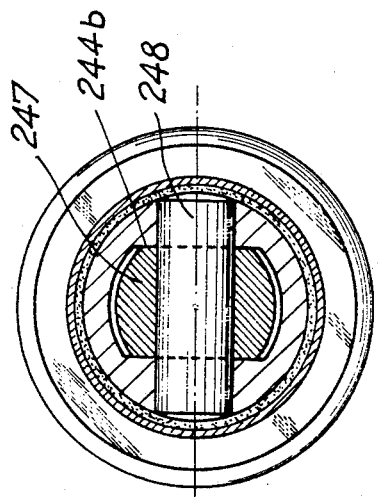
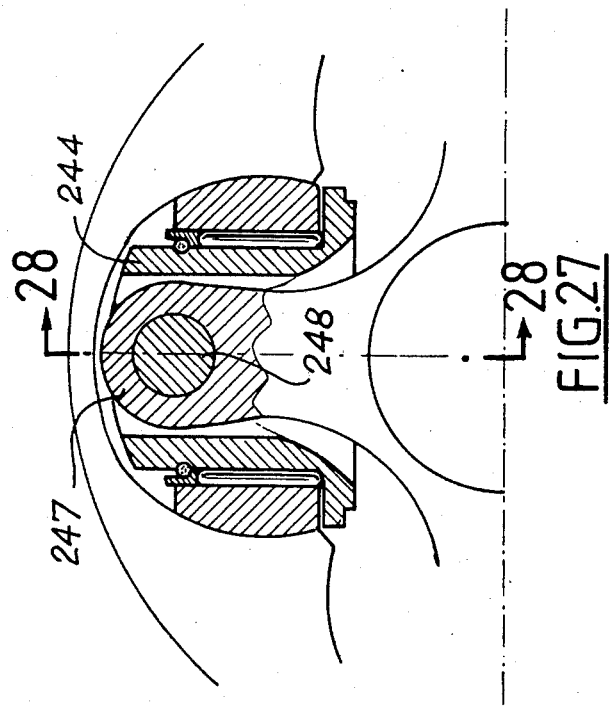
FIG.28
FIG.29
FIG.27

HOMOKINETIC VERY FREELY SLIDING JOINT IN PARTICULAR FOR OPERATING AT HIGH SPEED

BACKGROUND OF THE INVENTION

1. Field of the Invention

The present invention relates to homokinetic joints and in particular to joints which can slide very freely and which may be employed in high-speed transmissions.

2. Description of the Prior Art

Universal (or Hooke) joints mainly employed in motor vehicles are simple and reliable mechanical units having an excellent efficiency and are employed universally. However, the field of utilization of these mechanisms is limited by two well-known fundamental handicaps:

(a) The absence of homokinetic operation of the universal joint which creates torsional pulsations whose amplitude increases as the square of the operating angle.

(b) The opposition to sliding of the splined telescopic device usually associated with the universal joint to permit the adaptation of the shaft in length by compression and extension. While this sliding device may operate very smoothly when it is checked by hand, it is practically blocked in operation when a torque is applied thereto, as usually occurs in use.

It has been attempted to remedy these two major drawbacks of the universal joint by substituting therefor slidable homokinetic joints such as those employed in lateral transmissions of front wheel drive vehicles or those having a rear drive through independent wheels.

Unfortunately, the two families of homokinetic joints employed in these lateral transmissions, which are joints employing balls, or a tripod element, each have by their particular type of operation a limit in their use at high speed for the desired mean angles of operation. This limit may be characterized by the maximum possible product: $\beta N$, in which $\beta$ represents the continuous operating angle and N the continuous working speed under the required conditions of long life, reliability and comfort. If $\beta$ is expressed in degrees and N in revolutions per minute, it is usually acknowledged by experience that the upper limit of the product $\beta N$ for a universal joint is in the range of 20 000 to 30 000 depending on the size. In this case, the limit is due to the pulsating torque resulting from the torsional acceleration and the lack of homokinetic operation proportional to the square of $\beta N$.

In the case of joints employing balls, the limits are determined by their heating and their excessive rate of wear resulting from mechanical losses which are much higher than those of a universal joint, so that the allowable $\beta N$ is lower than that of the universal joint.

In the case of tripod joints which have an excellent efficiency and a sufficiently long life, the limit results from the planetary movement which is not permissible at very high speed.

SUMMARY OF THE INVENTION

An object of the present invention is therefore to provide a radially-centered, homokinetic, highly efficient joint, which provides a very free axial sliding and a high torque-transmission capacity within a given diameter, which qualities were not heretofore obtainable in the same joint.

Such a joint should solve in particular the problem of the transmission of power at high speed and at larger operating angles than those allowed by the known arrangements and under conditions of comfort, long life and lightness required in modern vehicles.

The invention therefore provides a homokinetic transmission joint of the type comprising a first element including rolling tracks having a circular cross-sectional shape, and a second element having radial trunnions on which are rotatively and slidably mounted rollers of spherical shape received in the tracks, the first and second elements having respective axes which may be angularly offset relative to each other, in which there are provided four pairs of rolling tracks which cooperate with four rollers of spherical shape, each pair of rolling tracks and a respective trunnion forming a rolling track-trunnion pair of members, one of said members of each pair being mounted relative to the element with which it is associated to be pivotable about an axis which is parallel to the axis of said associated element, and which is radially offset relative to the centre of the corresponding roller, each pivotable member having teeth engaged with complementary teeth of the adjacent pivotable members said teeth being adapted to achieve a conjugate pivoting of the pivotable members.

According to other features of the invention:

the connection between each pivotable member and the associated element is a non-sliding rolling connection between the conjugate teeth;

the connection between each pivotable member and the associated element is formed by a pin forming a pivot;

the teeth of each pivotable member are formed on a curved surface which is roughly centered on the pivot axis of said member;

the element having the rolling tracks comprises a barrel of cylindrical shape on the inner surface of which are pivotally mounted four channels each defining a pair of rolling tracks, these channels having a trough shape and including along their free edges teeth engaged with complementary teeth of the adjacent channels;

the element having the rolling tracks comprises a body of cylindrical shape defining four pairs of fixed rolling tracks and the four trunnions are pivotally mounted on the end of a shaft constituting the second element, each trunnion carrying, in the vicinity of its radially inner end or "foot", two sets of teeth engaged with the teeth of the adjacent trunnions;

each trunnion is pivotally mounted on its support to pivot about a pivot axis which is radially outwardly offset relative to the centre of the associated roller;

each trunnion is hollow and pivotally mounted on the end of, or in the vicinity of the end of, a branch of a spider element which extends inside this trunnion;

in the vicinity of its end closest to the axis of the joint, each trunnion has a radial flange on which are defined the teeth cooperating with the teeth of the adjacent trunnions.

BRIEF DESCRIPTION OF THE DRAWINGS

The invention will now be described in more detail with reference to the accompanying drawings which are given solely by way of example and in which:

FIG. 1 is a cross-sectional view of a homokinetic joint according to the invention in the aligned position of the two parts interconnected by the joint;

FIG. 2 is a longitudinal sectional view of the same joint in the broken position, at an angle of about 35°, of the two parts interconnected by the joint;

FIG. 11 is a view of the channel shown in FIG. 10, mounted in a barrel;

FIG. 15 is a cross-sectional view of another embodiment of a joint according to the invention;

FIG. 16 is a partial sectional view taken on line 16—16 of FIG. 15;

FIG. 17 is a sectional view taken on line 17—17 of FIG. 15;

FIG. 21 is a sectional view taken on line 21—21 of FIG. 20;

FIG. 23 is a partial sectional view taken on line 23—23 of FIG. 21;

FIG. 24 is a view similar to that of FIG. 23 of a modification;

FIG. 25 is a partial sectional view of another modification;

FIG. 26 is a sectional view taken on line 26—26 of FIG. 25;

FIG. 27 is a partial sectional view of another modification;

FIG. 28 is a sectional view taken on line 28—28 of FIG. 27, and

FIG. 29 is a sectional view taken on line 29—29 of FIG. 28.

DETAILED DESCRIPTION OF THE PREFERRED EMBODIMENTS

Figure 3:
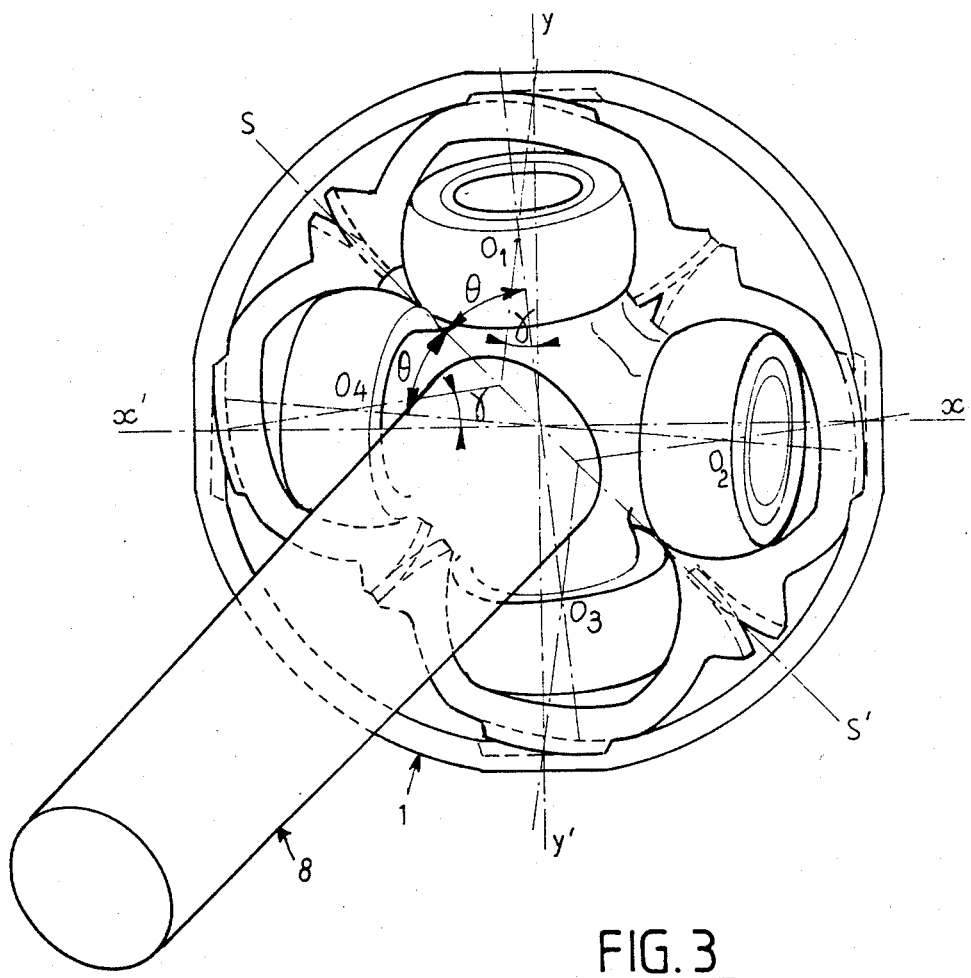
FIG. 3 shows the same joint as viewed along the axis of the barrel in a broken position, which will be explained hereinafter.

The homokinetic joint shown in FIGS. 1 to 3 comprises a first or outer element formed by a cylindrical barrel 1 which may be fixed, for example by a flange and bolts or by any other known means, to one of the mechanical parts to be connected. This barrel has in its inner surface four zones which have flat or slightly curved surfaces in which four longitudinal teeth or splines 2 are formed. These zones extend in segments each of which are about 30° and are also on the inside of the barrel.

Four trough-shaped channels 3 bear against the inner splines of the barrel, through longitudinal teeth or splines 4 of the same modulus machined on the outer surface of their arch 3a. The mean outer radius of this arch is less than that of the splined segments of the barrel, which may be moreover rectilinear, so as to permit the channels to pivot without sliding by rolling inside the barrel which provides meshing of the splines similar to a gearwheel having internal teeth.

The inner surface of each of these channels has two concentric circular segments 5 forming a pair of rolling tracks which are centered on a point O and located in confronting relation to each other, these two segments being connected by an inner arch 6 which, moreover, may coincide with the two segments.

The channels have two edges on which teeth or splines 7 are machined on cylindrical surfaces of the edges. The mean radius of curvature of each cylindrical surface is approximately centered on the median axis of the splines 4 of the arch 3a of these channels. Thus, when these four channels are in position within the barrel, they are pivotable without clearance therebetween and without stiffness due to the rolling of the teeth or splines having involute flanks 2, 4 and 7, in contact with each other in the manner of planetary gears engaged inside a gearwheel having internal teeth. Each channel is pivotable about an axis which is parallel to the axis of rotation of the barrel 1 and which is radially offset relative to the center of a corresponding roller received in each respective channel.

The joint also includes a shaft 8 welded or fixed by means of splines 9 to a spider element 10 axially retained on the shaft 8 by a ring 18. This spider element has four trunnions 11 oriented along two co-planar perpendicular axes and on which are mounted rollers 12 having a spherical outer surface 13. These rollers are slidably and rotatively mounted on the trunnions, either by direct contact between their bore 14 and the trunnion, or with interposition of needles 15 axially retained by a device having a ring 16 and a suitably shaped washer 17 in the known conventional manner.

These rollers, which have a curvature similar to those of the surfaces 5 of the channels defining the rolling tracks, are freely movable inside these channels. The rollers 12 roll along the rolling tracks 5 which are surface-hardened in order to support the great loads without deformation or wear. The channels 3 are axially retained in the barrel by means such as rings or circlips 19 engaged in grooves 20 machined on the ends of the barrel 1.

This first embodiment of a joint according to the invention operates in the following manner:

As concerns first of all the kinematic operation of the channels 3, relative to the shaft 8 it can be seen that, when the channel centered on $O_1$ turns clockwise to the right, the channel centered on $O_2$ turns counterclockwise to the left, the channel centered on $O_3$ turns clockwise to the right, and the channel centered on $O_4$ turns counterclockwise to the left. The instantaneous center of rotation of each of the channels relative to the barrel moves along the respective mean axis of the splines 2. Consequently, $O_1$ and $O_2$, on one hand, and $O_3$ and $O_4$, on the other, move away from each other, while, moreover, $O_4$ and $O_1$, on one hand, and $O_2$ and $O_3$, on the other, move towards each other. If the direction of rotation of one of the channels is reversed, all the rotations and all the relative movements are also reversed. The movements of the points $O_1$ to $O_4$ represented by the arrows $T_1$ to $T_4$ are equal in absolute value, perpendicular to the vector radii and in alternating directions. Consequently, according to one of the features of the present invention, the straight lines $\overline{O_1 O_3}$, on one hand, and $\overline{O_2 O_4}$, on the other, always pass through the center P of the spider element and interest along the central axis of the barrel. It may be deduced, according to a second feature of the invention, that the rotation of $\overline{O_1 O_3}$ is equal and in opposite direction to the rotation of $\overline{O_2 O_4}$.

When a torque C is applied to the shaft 8, and therefore to the spider element 10, the channels 3 cannot pivot relative to the barrel, since their movements due to the torque would oppose each other owing to the action of the conjugate teeth 7, which has the effect of preventing any pivoting of the channels under the action of the torque. On the other hand, the forces applied to the rollers are equal, and all the channels transmit an equal part of the torque, namely, each one being equal to C/4. This is so notwithstanding a defect in the circular division of the spider element or of the inner splines 2 of the barrel. In other words, the connection between the spider element and the channels is isostatic.

It is clear that when the shaft (FIG. 2) is put at an angle $\alpha$, no pivoting of the channels occurs since this positioning at an angle occurs around one of the two axes $\overline{O_1 O_3} \overline{O_2 O_4}$ of the trunnions of the spider element. The center P of the spider element, which is the intersecting point of the axes $\overline{O_2 O_4}$ and $\overline{O_1 O_3}$, remains on the longitudinal central axis of the barrel 1. Therefore, there is no relative rotation between the spider and the barrel about their respective axes of rotation. Therefore, the setting of the shaft and the barrel as concerns rotation remains constant when the angular position is created by rotation about one of the axes $\overline{O_2 O_4}$ and $\overline{O_1 O_3}$ of the spider element.

FIG. 3 shows the same joint viewed along the axis of the barrel after a breaking of about 35° of the shaft about an axis SS' making an angle of 45° with the axes $\overline{O_1 O_3}$ and $\overline{O_2 O_4}$ of the spider element. These axes, which are by construction fixed at 90°, and therefore in true magnitude, make in this view an angle $\theta$ of less than 45° with SS'. In order to accommodate this movement, the channels have pivoted through an angle $\gamma$ relative to the barrel and symmetrically relative to the axis SS', as they are constrained to do so by the effect of the teeth 2, 4 and 7. Consequently, the axis SS', which is the bisector of the trunnions of the spider element, is also the bisector of the right angle between xx' and yy' of the barrel 1. In other words, a break angle about a bisector axis of the trunnions result in no rotation of the shaft 8 relaive to the barrel 1.

This result shows an essential advantage of the joint according to the invention over a universal joint which has a similar spider element.

Indeed, the universal joint has its maximum lack of homokinetic operation upon the breaking about a bisecting axis of the trunnions, while the lack or defect is nil for a breaking about the axes of the spider element.

For example, with respect to a universal joint having a break angle of $\alpha = 35°$, the maximum homokinetic deviation is: $\epsilon = 45° - \arctan. \cos \alpha = 45° - \arctan. \cos 35° = \pm 5°67$.

This produces a total angular fluctuation of 11°35 twice per revolution, the deviation being maximum when the plane of the two shafts interconnected by the joint is bisector of the axes of the spider element and nil when the plane of the shafts contains one of the axes of the spider element.

Another important advantage of the joint according to the invention resides in a torque capacity of about three times that of the universal joint having the same overall size.

Indeed, in the universal joint, two journals are to be considered in the calculation of the capacity, whereas in the joint according to the invention the torque is transmitted simultaneously through the four trunnions to the barrel, this torque being introduced in the spider element through the central splines.

According to the invention, the load is equally divided between the four trunnions, and the pressure is axially constant along these trunnions and may be circumferentially constant by providing a special but simple machining of their profile, according to a known process (French Pat. Nos. 1,380,557 and 1,401,983). This practically ideal pressure distribution is far from being achieved on the trunnions of a universal joint, owing to lack of alignment between the yoke and the spider element resulting from the machining or elastic distortions due to the effect of the transmission of torque.

Another important advantage of the joint according to the invention is that it has very interesting possibilities of a very free axial sliding under transmission of torque when the two parts interconnected by the joint are in alignment or at an angle, and thus provides a perfect axial nuetrality.

Figure 4:
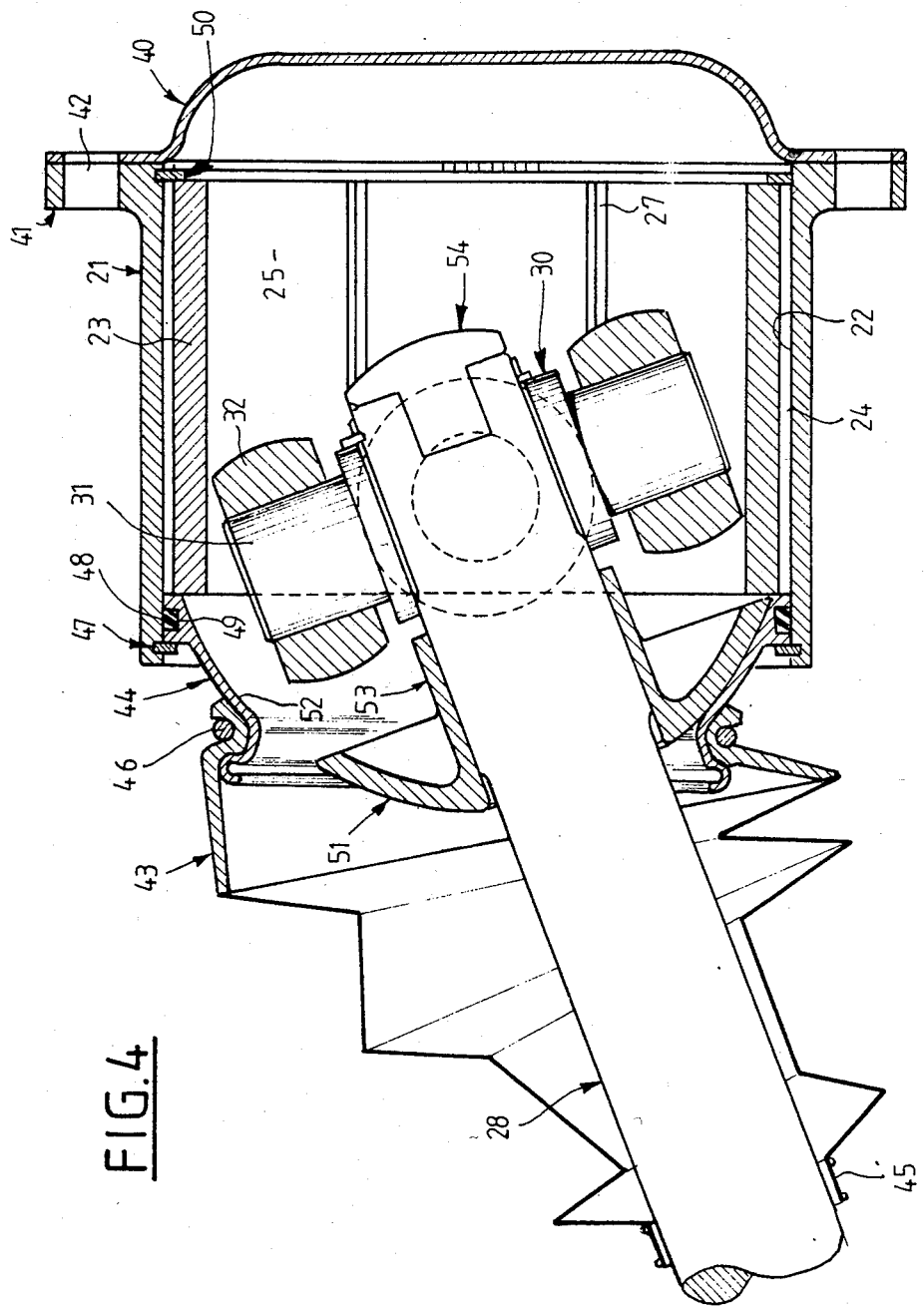
FIG. 4 is a longitudinal sectional view of a sliding version of the homokinetic joint according to the invention.

FIG. 4 shows a sliding version of the homokinetic joint according to the invention. The same essential parts are found therein as in the embodiment shown in FIGS. 1 to 3, namely a barrel 21 having four splined internal zones 22, four channels 23 provided with teeth or splines 24 cooperating with the teeth or splines 22, and mutually engaging teeth or splines 27. These channels also define the rolling tracks 25 for rollers 32 which are rotatively and slidably mounted on trunnions 31 of a spider element 30. In contrast to the preceding embodiment, the rollers are here directly mounted on their trunnions without interposition of needles.

The mechanism is sealed by an end wall 40 applied against a flange 41 of the barrel 21 by means such as bolts (not shown) extending through openings 42.

The seal between the barrel 21 and a shaft 28 is afforded by a bellows or gaiter 43 fixed to the shaft 28 and to a flange 44 by clamping rings 45 and 46. The flange 44 is fixed inside the barrel in a sealed manner by a circlip 47 and a rubber sealing element 48 disposed in a groove 49. The channels 23 are retained between an edge of the flange 44 at one end of the barrel 21 and a circlip 50 provided at the other end of the barrel 21. A spherical abutment 51 of plastics material mounted on the shaft 28 so as to confront the flange 44 ensures the retention in maximum extension of the joint while avoiding percussion noises. The abutment 51 is capable of swivelling on an inner spherical zone 52 of the flange 44 and retains the body of the spider element 30 inside the barrel 21 by means of a skirt 53 mounted on the shaft 28. The end of the shaft 28 is axially retained in compression by the fact that a mushroom shaped member 54 of plastics material mounted on the end of the shaft 28 bears against the end wall 40.

This embodiment is particularly adapted for use with apparatus having lateral transmission shafts driving the wheels of front wheel drive or rear propelled vehicles. The exactly symmetrical sliding and pivoting movement for the opposed rollers completely eliminates the axial component of friction, so that this joint is perfectly neutral axially when it rotates under torque and at an angle. Thus, it does not introduce a cyclic axial pulsation in the transmission shaft, as most slidable homokinetic joints do. An increased comfort to vehicle occupants results from this arrangement. This simple and sturdy version therefore has all the required qualities of comfort for this type of application.

FIGS. 5 to 8 show a version of this joint whose sleeves or channels 63 comprise rolling tracks 65 having a circular cross-sectional shape and having a curvilinear axis 65a. In other words, the rolling surfaces 65 of the rollers 72 are toric and roughly centered on the centre O of the joint. The advantage of this feature is to still further reduce friction, principally when the continuous operating angle is high, and to permit the installation of a simple device for ensuring the axial retention by means of the channels 63, independently of the barrel 61.

Figure 7:
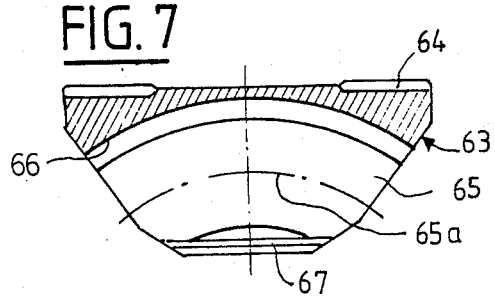
FIG. 7 is a partial sectional view of a member of the joint shown in FIG. 5.
Figure 8:
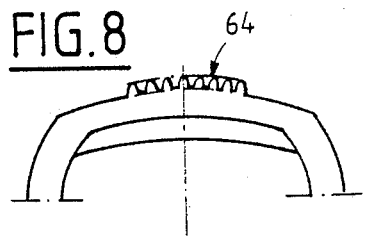
FIG. 8 is a sectional view of FIG. 7.

FIGS. 7 and 8 represent the toric channels of this version. The driving splines 62 extending along the axial length of the barrel are located opposite to splines 64 on the ends of the channels, while the conjugate splines 67 of the channels are located in their internal median part. The channels are axially retained within the barrel 61 by the circlips 79. Abutments 80 having a spherical surface 81 are fitted in openings 82 formed in the end faces of the arms 71 of the spider element 70, and each abutment 80 slides on an end wall 66 of the channels extending between the pair of rolling tracks 65, during joint operation, and ensure the axial retention of the spider element and therefore of the shaft 68 with respect to the barrel of the joint.

As the splines 62 extend throughout the length of the barrel, the moving unit comprising the spider element, the shaft and the rollers, on one hand, and the channels, on the other hand, may be axially slid inside the barrel. It will be clear that the moving parts of this joint may be assembled just as simply inside a wheel hub, for example, whose bore would have the same profile as the barrel 61 shown in FIG. 5.

According to one of the features of the invention, the inclination of the teeth or the pressure angles $\alpha$ and $\beta$ (FIG. 9) are such that the applied forces are roughly perpendicular to the flanks of the operative teeth, depending on the considered direction of transmission of the torque. Under this condition, a single flank of each tooth receives applied pressure and the frictional losses are minimum.

Figure 9:
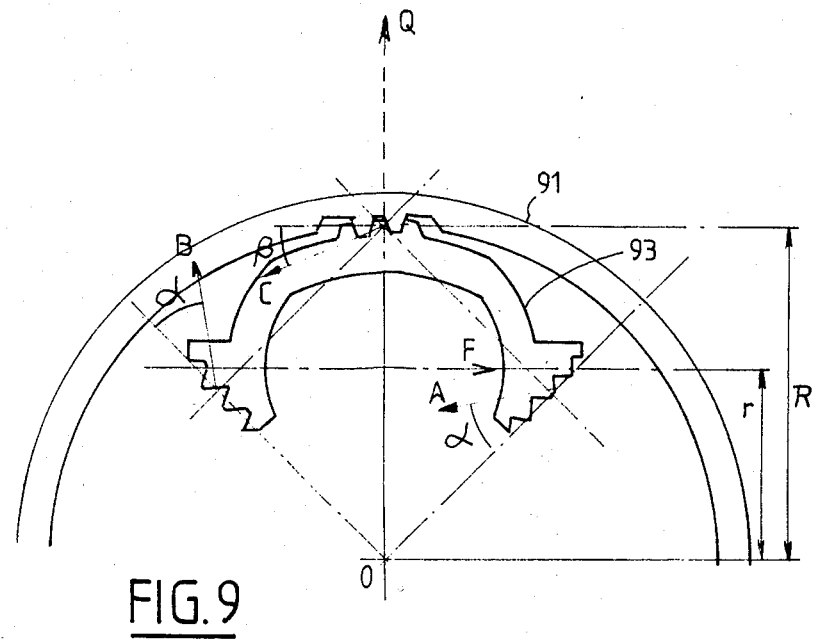
FIGS. 9 to 13 are partial sectional views of four embodiments of the channels defining the rolling tracks, and more particularly of the means for pivotally mounting them on the outer element of the joint.

FIG. 9 shows an example of the application of this rule, with respect to a joint designed to operate at moderate speed and consequently in which the centrifugal force applied to the channels and the rollers is negligible as compared to the torque transmitting forces shown by A, B, C and F.

The channel 93 diagrammatically shown in the barrel 91 is in equilibrium under the effect of the forces A, B and C which are applied in a direction perpendicular to the flanks of the teeth with pressure angles $\alpha$ for A and B and $\beta$ for C and to the direction of the force F exerted by the roller.

It is easy to calculate as a function of R and r, the characteristic dimensions of the joint, the relative values of the angles $\alpha$ and $\beta$ satisfying the above condition. For example: if R=52 mm and r=30 mm, possible corresponding values of $\alpha$ and $\beta$ are given by the following table:

| $\alpha$ | 30° | 37° 5 | 45° | 60° |
| --- | --- | --- | --- | --- |
| $\beta$ | 22° 94 | 29° 36 | 36° 25 | 51° 78 |

If it is desired to achieve this condition of maximum efficiency with respect to a high-speed joint, there must be taken into account the value of the centrifugal force Q applied to the rollers and to the channels represented in dotted lines, which is no longer negligible relative to the torque-transmitting forces A, B and C considered in FIG. 9. This involves increasing the pressure angle $\beta$ with respect to $\alpha$.

In applications where the joint must be capable of rotating at very high speed, the centrifugal force Q may be distinctly greater than the most frequent torque-transmitting forces A, B and C. It is therefore advantageous according to one of the features of the invention to provide one or more pure rolling zones between the back of the channel and the bore of the barrel, so as to support this centrifugal force Q. The teeth on the back of the channel may in this case only transmit the useful component of the force C if a pressure angle: $\beta=0$ (FIG. 9) is chosen. In this way, the meshing friction coming from the centrifugal force Q is eliminated, and the efficiency of the joint is improved.

Figure 10:
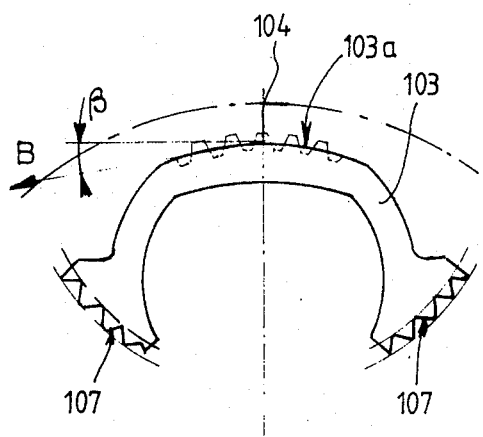

FIG. 10 shows such a channel 103.

Figure 11:
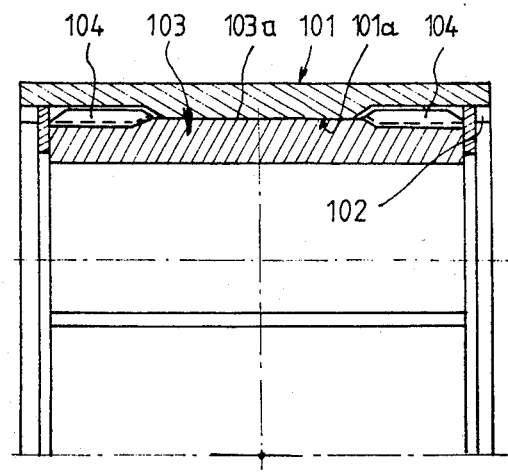

FIG. 11 shows such a channel assembled within the interior of a barrel 101.

The channel 103 comprises a cylindrical back bearing surface 103$^a$ in its median region which rolls on a bearing surface 101$^a$ located inside the barrel. This bearing surface 101$^a$ may be planar or cylindrical with a center of curvature located inside or outside the barrel. The channel carries back teeth 104 at both ends, which mesh with internal complementary teeth 102 of the barrel. Their rolling circles coincide with the bearing surfaces 103$^a$ and 101$^a$ so that no sliding occurs between these bearing surfaces when the joint rotates at an angle. The angle $\beta$ of the back teeth may be reduced as desired in accordance with constructional possibilities. The conjugate teeth 107 of the channels, which are hardly stressed by the centrifugal force, must permit the connection without stiffness and without play of the channels during their pivoting, as in the other versions of the joint. Circlips fitted in grooves machined in the teeth 102 axially retain the channel 103. By way of a modification, the teeth may have a slightly helical shape and the pitches may be inverted between the teeth at the two ends so that the channels 103 are retained in the absence of any circlip. It will be understood that each channel may have a plurality of back rolling surfaces interposed with zones of teeth.

Generally, the teeth of the channel may extend over only a part of its length and may be arranged in one or more portions thereof, whether this concerns conjugate teeth or back teeth and these channels may or may not include rolling bearing surfaces.

Figure 12:
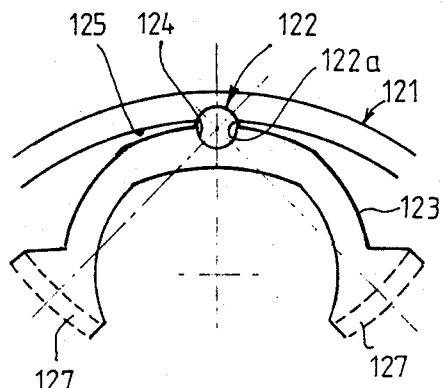
Figure 13:
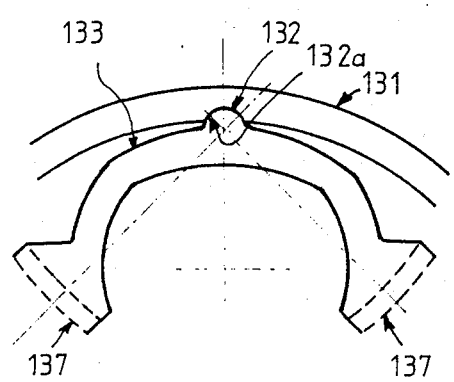

Another pivotal mode may be advantageously employed for the pivoting of the channels on the barrel shown in FIGS. 12 and 13.

The channels 123 here pivot relative to the barrel 121 about a fixed axis embodied in this instance by a cylindrical surface of a pivot means 122 (FIG. 12) of hardened steel disposed, on one hand, in a longitudinal cylindrical recess 122$^a$ machined in the inner surface of the barrel 121 and, on the other hand, in a similar recess 124 longitudinally machined on the back of the channel 123. A sufficient space 125 is left between the walls of the channel and the barrel to allow for pivoting of the channel through the required angle.

In FIG. 13, the pivot means 132 is unitary with the channel 133 and thus constitutes a longitudinal semi-cylindrical projection which bears in a semi-cylindrical recess 132$^a$ machined longitudinally in the inner surface of the barrel 131.

The conjugate teeth 127, 137 extend in a circumferential path centered on the axis of the pivots 122 and 132.

Notwithstanding the sliding around these pivots, the pivotal movements occur under good mechanical conditions since the lubrication is effective and the movements are of a small extent.

Figure 14:
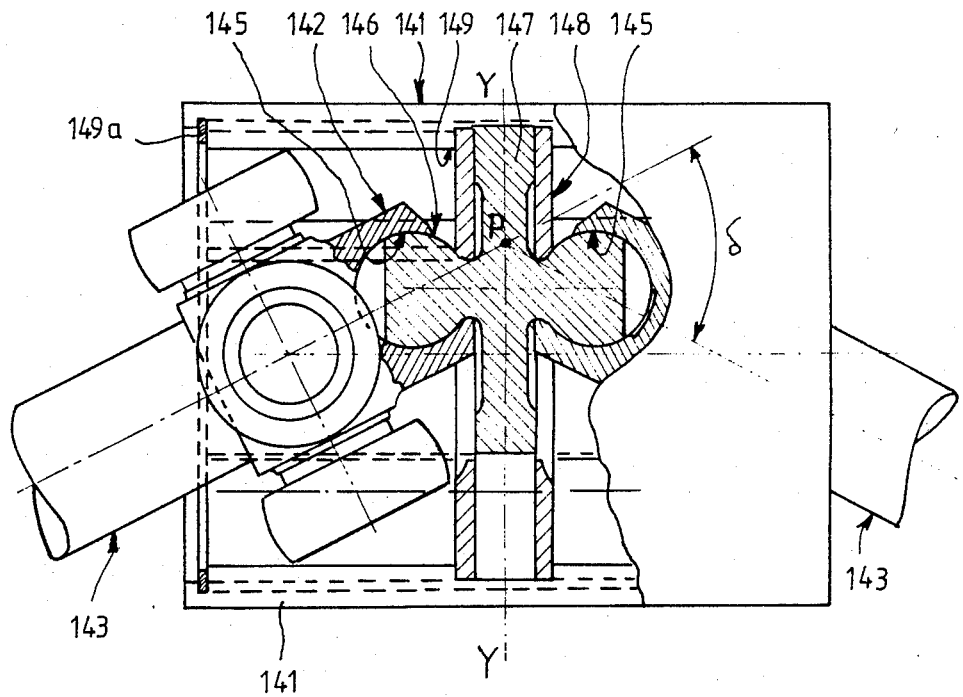
FIG. 14 is a longitudinal sectional view of a modification representing a double joint.

FIG. 14 shows a double joint capable of operating at a large angle and comprising two basic joints such as that shown in FIGS. 1 to 3, disposed symmetrically on each side of a plane Y—Y and employing a common barrel 141. The end portions 142 of opposite shafts 143 each include a spherical cavity 145 in which is pivotally mounted a respective one of two spheres 146 fixed on each side of a disc 147. The latter is maintained in the plane Y—Y perpendicular to the plane of the figure by guide 148 between which it slides radially when the joint rotates at an angle. Thus the coincidence of the axes is ensured at the point P. The guides 148 are laterally maintained in the barrel 141 by channels 149 which are retained in the barrel 141 by circlips 149$^a$.

FIGS. 15 to 17 show a second embodiment of a joint according to the invention. Whereas in the embodiments described heretofore the elements defining the rolling tracks were mounted in such manner as to be pivotable relative to the barrel, in this second embodiment, the rolling tracks are fixed relative to the barrel, and it is the elements on which the rollers are supported which are mounted to be pivotable relative to their support.

More precisely, there is shown in the joint represented in FIGS. 15 to 17 a barrel 201 defining four pairs of rolling tracks 202 having a circular cross-sectional shape, these four pairs of rolling tracks being disposed about two perpendicular axes x'x and y'y. Four rollers 203 which roll along these rolling tracks are rotatively and slidably mounted on trunnions 204, either with interposition of needles 205 retained by known means, or directly by smooth sliding contact, in particular if the operating speed of the joint does not exceed 2 000 to 3 000 rpm.

The power-transmitting shaft 206 has at the end disposed in the joint an enlarged portion 207 which is machined and hollowed out so as to permit the mounting of four trunnions 204. The hollow part has a cross shape and this shape and the dimensions are such that feet 208 of the trunnions can be received therein with a possibility of a pivotal movement due to a clearance 209 therebetween (FIG. 17). Each trunnion is pivotally mounted on the enlarged portion 207 by means of to pins 210 disposed in bores 211 in the enlarged portion 207 and extending through openings 212 in the trunnions.

These four trunnions include along their inner edges teeth 213 which extend along cylindrical surfaces roughly centered on central axes of the pins 210 and are adapted to ensure the combined or conjugate pivoting of the four trunnions in such manner that when the distances $\overline{O_1 O_2}$, on one hand, and $\overline{O_3 O_4}$, on the other hand, decrease, the distances $\overline{O_1 O_4}$, on one hand, and $\overline{O_2 O_3}$, on the other hand, increase in the same manner as described with reference to the operation of the channels shown in FIG. 3.

The operation is consequently the same as that described with respect to the first embodiment, and there is achieved in the same way an isostatic and homokinetic connection between the shaft 206 and the barrel 201 irrespective of the relative angular position of these two elements. The torque-transmitting forces exerted by the rollers 203 on the rolling tracks 202 are always equal to one another.

Figure 5:
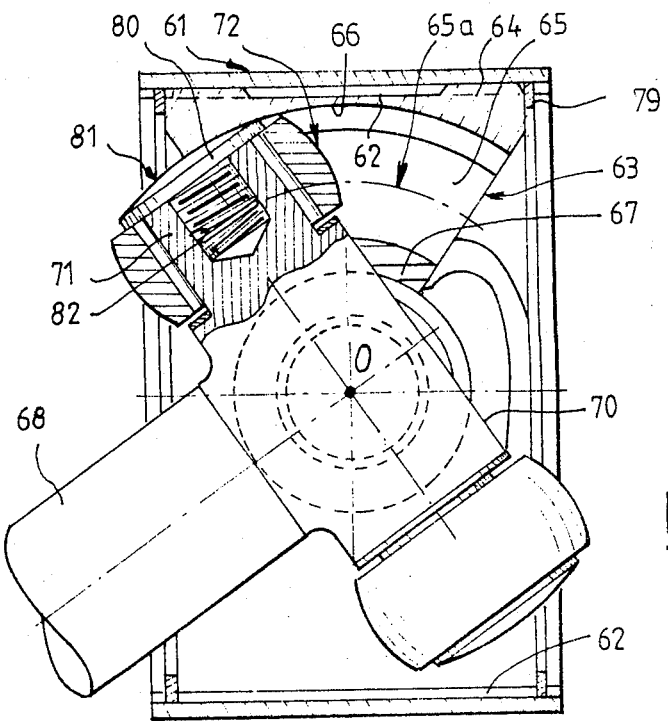
FIG. 5 is a longitudinal sectional view of an embodiment of the joint according to the invention which has toric tracks.
Figure 6:
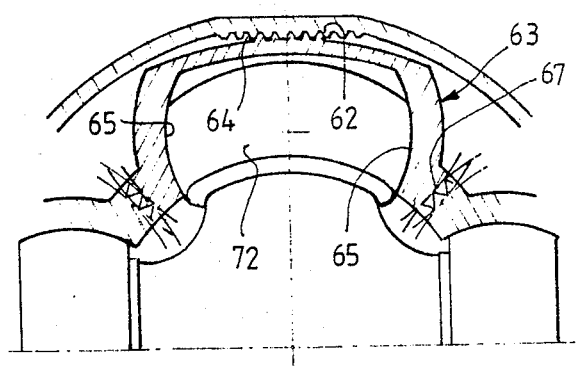
FIG. 6 is a partial sectional view of FIG. 5.

It will be understood that the rolling tracks 202 may have rectilinear axes or mean lines as in the embodiment shown in FIGS. 2 and 4, or circular axes as in the embodiment shown in FIG. 5. In the latter case, the surfaces of these rolling tracks are toric.

Further, the same arrangements may be adopted in this type of joint as in the first embodiment, namely axial retaining means, the construction of a slidable joint, etc.

Figure 18:
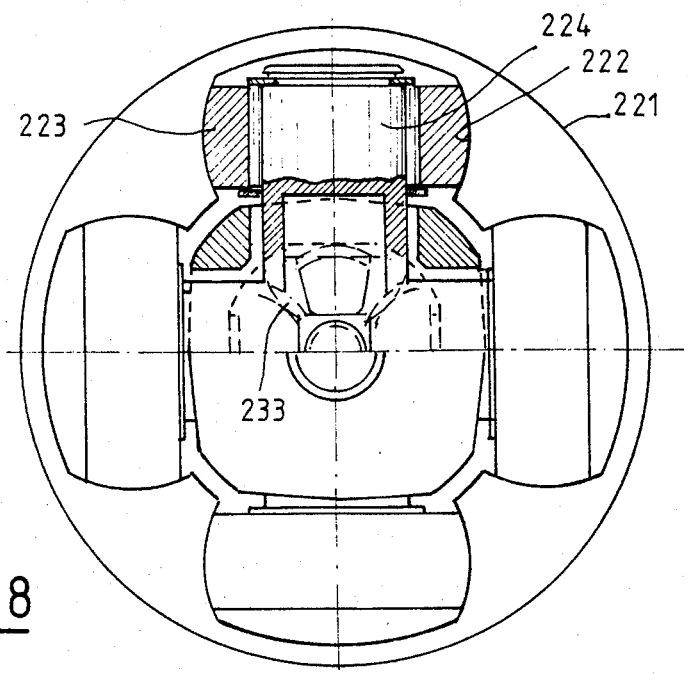
FIG. 18 is a cross-sectional view of another modification.
Figure 19:
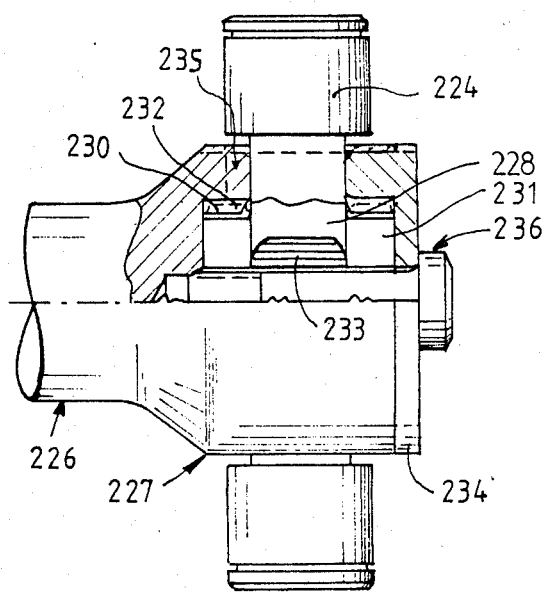
FIG. 19 is a partial lateral elevational view of a part of the joint shown in FIG. 18.

FIGS. 18 and 19 represent another version of this second embodiment having a pivotal spider element in which the trunnions 224 are pivotally mounted on a head or enlarged portion 227, rigid with the shaft 226, by means of teeth 230 formed on lateral portions 231 extending on each side of the feet 228 of the trunnions. These teeth 230 may roll on complementary teeth 232 located, on one hand, on an inner surface of a hollow part of the enlarged portion 227 of the shaft 206 and, on the other hand, on a radially inner surface of a cover 234 fixed on the enlarged portion 227. The cover 234 is prevented from rotating by four tenons 235 and is retained axially on the shaft 226 by a screw 236. Teeth 233 machined or formed on inner ends of the trunnions 224 ensure, as in the embodiment shown in FIGS. 15 to 17, the combination of the conjugate pivotal movements of these trunnions with rollers 223 thereon received in rolling tracks formed in a barrel 221 when the joint rotates at an angle.

The operation of such a joint is also the same in its principle as that of the other previously-described embodiments.

Such a joint in its various embodiments results in the following advantages:

(a) High specific homokinetic transmitting power in a continuous operation at an angle. This quality is the result of three characteristics of this joint:

high mechanical efficiency; and
  compactness;
  isostatic torque transmission.
  If C is the transmitted torque
  N the speed of rotation
  $\beta$ the corresponding operating angle
  D the overall diameter:
  the specific capacity characterizing a homokinetic joint which is useful for affording a comparison of performance is represented by the expression: $\tau = CN\beta/D^3$.

This specific capacity corresponds to the continuous operating conditions the joint is capable of withstanding without a premature deterioration due to excessive heating and destruction of the lubricant. The joint according to the invention has a value $\tau$ at least three times that of other known homokinetic types of joints. This high value has a very beneficial effect on the overall size, the weight, the life and the cost of the joint.

(b) Silent vibration-proof operation.

Consequently, this joint satisfies all the required conditions for participating in the comfort of motor vehicles:

homokinetic operation independently of the operating angle;

perfect radial centering with complete elimination of constructional play during the rotation, which allows a perfect and durable equilibrium for a high speed utilization; and possibility of a very free sliding when transmitting torque, with the parts interconnected by the joint being in alignment or at an angle; moreover, there is a complete axial neutrality when operating at an angle and transmitting torque.

(c) This joint may be cheaply constructed with standard cold-formed sectional elements, in particular the channels and the barrel which may be employed both for axially fixed joints and for slidable joints. In the latter case, the required sliding capacity is afforded by simply cutting the section elements of the channels and barrel to the required length.

The channels may be cheaply constructed by drawing, extruding and/or knurling, according to known processes used in the industrial fabrication of precision section elements. They are hardened, preferably by induction heating and quenching, as they pass through the induction means and cut or cropped to the required lengths for assembly inside the barrels. They may also be terminated by a cold forming or a broaching and, if necessary, may be ground as they pass through the grinding machine after hardening by means of one or more shaping grinding wheels the profile of which is guaranteed by a continuous dressing by means of diammond carrying wheel.

The inner teeth of the barrel may be obtained by broaching or cold forming by a four-directional radial action on the exterior or the interior of the wall.

Note that for a given operation or service, such a joint is lighter and smaller than known joints, which results in a reduction in the cost by a decrease in the amount of material to be supplied and employed.

FIGS. 20 to 24 show a homokinetic joint comprising a barrel 241 defining four pairs of rolling tracks 242 having a circular cross-sectional shape, these four pairs of rolling tracks being disposed, in pairs, about two perpendicular axes x'x and y'y. Four rollers 243 which roll on these rolling tracks are rotatively and slidably mounted on trunnions 244, with interposition of needles 245 retained by known means (collar 245$^a$ and ring 245$^b$), or directly by a smooth sliding contact, especially if the speed of operation of the joint does not exceed 2,000 to 3,000 rpm.

A shaft 246 transmitting power to the barrel 241 has at its end disposed in the joint a spider element 247 which may be secured to the shaft by splines or welding.

A trunnion 244 is pivotally mounted at each end of the branches of the spider element by means of a pin 248 which extends in cavities 249, 250 provided in the spider element and the trunnion. The pins 248 may advantageously be maintained by their spherical end portions 248$^a$ which come into contact with the collar 245$^a$ retaining the needles. The trunnion 244 is retained and pivoted about the direction zz' (FIG. 22) by the circular contact of a spherical zone 247$a$ formed on an enlarged portion of the spider element 247, with a cylindrical bore 244$^a$ in the trunnion 244.

For receiving the associated branch of the spider element 247, each trunnion 244 has a cavity 251 therethrough a which becomes longer at a flared portion 252 of an inner wall of the trunnion oriented toward the center of the joint so as to allow movements relative to the spider element. The branches of the spider element are wider towards the center of the joint in a corresponding manner and include an intermediate portion 253 of reduced cross-section for the same purpose of allowing angular movements of the trunnions.

At an inner end of each trunnion, i.e. the end adjacent to the center of the joint, each trunnion has a radially outwardly extending flange 254 in which teeth 255 are provided. These teeth may be straight (FIG. 23) or curved (FIG. 24) and preferably have an involute profile.

This joint operates in the same way as the joint described with reference to FIG. 15, except that the pivot axis of each trunnion is radially offset outwardly relative to the center of the associated roller which results in a number of additional advantages:

the torque-transmitting capacity is higher for a given diameter of the joint;

the pressure supported by the teeth is reduced; and as these teeth are a little further away from the axis of the joint, their lubrication is correspondingly improved.

In the embodiment shown in FIGS. 25 and 26, in which the barrel of the joint is not shown, there is shown, as in the preceding embodiment, trunnions 260 pivotally mounted on the branches of a spider element 261 by means of pins 262. The pivot pins of the trunnions are also outwardly radially offset relative to the centers of the associated rollers 263.

In this embodiment, the trunnion has two diametrically opposed recesses 264 in its skirt and there are formed in the bottom of the recesses V-shaped notches 265 cooperating with complementary projecting portions 266 provided at the ends of the pin 262. The pin 262 is sized for a drive-fit in a bore 267 of the spider element. The complementary flanks of the notches and the projecting portions preferably have an involute profile.

Each trunnion also has a flange 268 provided with teeth (not shown) meshed with the teeth of the adjacent trunnions.

In this embodiment, the roller 263 is shown directly mounted on the cylindrical outer surface of the trunnion 260 and consequently without interposition of needles.

The embodiment shown in FIGS. 27 to 29 is provided to improve the transmission of axial forces between the trunnions and the ends of the branches of the spider element.

Figure 20:
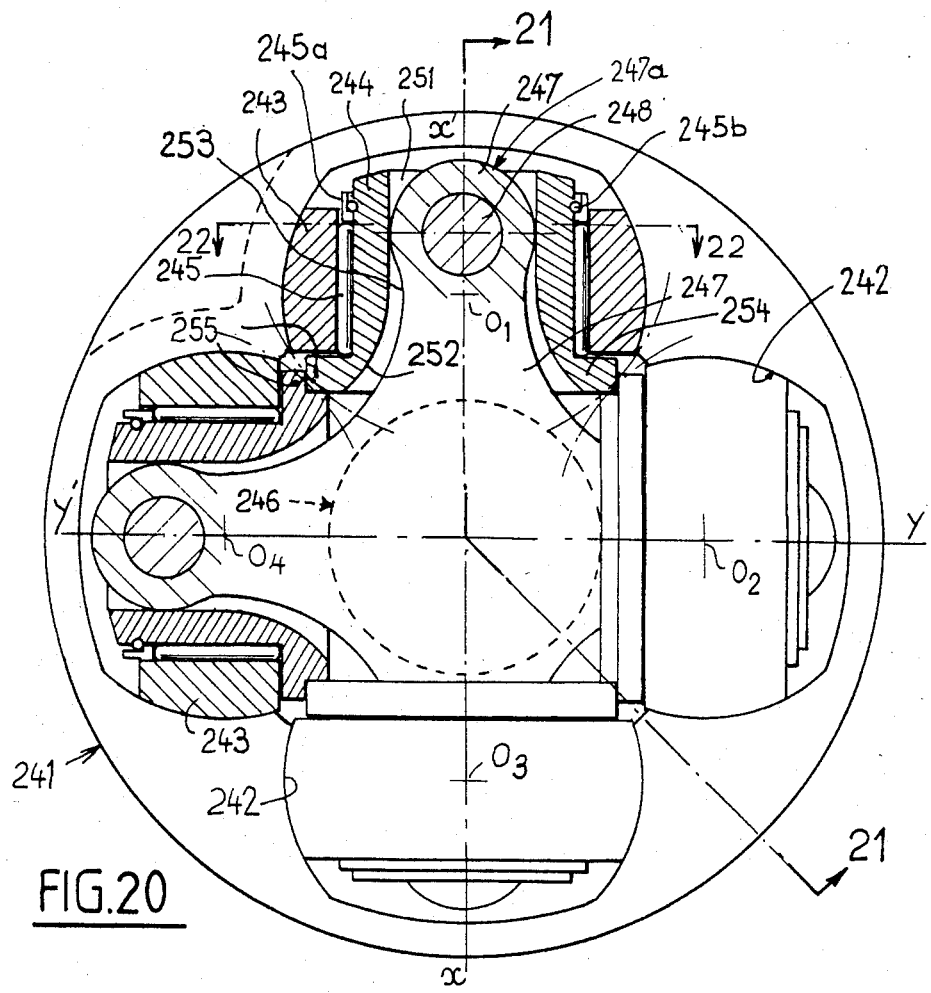
FIG. 20 is an end elevational view, with a part in section, of a joint according to the invention.
Figure 22:
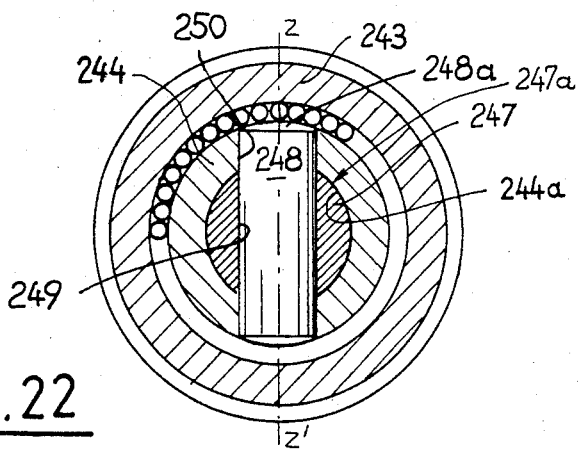
FIG. 22 is a sectional view taken on line 22—22 of FIG. 20, the barrel of the joint being omitted.

In the case of FIGS. 20 to 22, this transmission of forces in the direction of the pivot pin 248 occurs between the spherical portion of the end of the arm and the bore of the trunnion.

In the embodiment shown in FIGS. 27 to 29, each branch of the spider element and of the associated trunnions have confronting walls perpendicular to axis zz' which are planar as shown at 244$^b$ and 247$^b$.

it is in the region of these walls that the axial transmission of forces occurs, which is thus improved.

It will be understood that, as in the previously described other embodiments, the rolling tracks may have rectilinear or circular mean lines or axes. In the first case, the surfaces of the rolling tracks are cylindrical and in the second case they are toric.

Further, various arrangements may be adopted in this type of joint, namely: axial retaining means, the provision of a sliding joint, etc.

While the invention has been described with reference to the foregoing embodiments, it should be understood that various changes and modifications may be made without departing from the spirit and scope of the invention.

What is claimed is:

1. A homokinetic transmission joint comprising a first element comprising means defining four pairs of rolling tracks of circular cross-sectional shape and a second element comprising means defining four radially extending trunnions, and four rollers of spherical shape rotatively and slidably mounted on the trunnions and received in the pairs of rolling tracks, said first and second elements having respective axes of rotation which may be angularly offset with respect to each other, each pair of rolling tracks and a respective trunnion forming a rolling track-trunnion pair of members, one of said members of each pair being mounted relative to said element with which it is associated in such manner as to be pivotable about an axis which is parallel to said axis of rotation of said associated element and which is radially offset relative to a center of the corresponding roller, each pivotable member comprising a set of teeth engaged with a complementary set of teeth of adjacent pivotable members, the set of teeth of each pivotable member being adapted to achieve a conjugate pivotal movement of the pivotable members.

2. A homokinetic joint according to claim 1, wherein the connection between each pivotable member and the associated element is a non-sliding rolling connection between the conjugate sets of teeth.

3. A homokinetic joint according to claim 1, comprising a pivot pin connecting each pivotable member to said associated element.

4. A homokinetic joint according to claim 1, wherein the element comprising said means defining said four pairs of rolling tracks comprises a barrel of cylindrical shape having an inner surface and four channels comprising said pivotable members, each of said channels having an inner surface defining a pair of said rolling tracks and being pivotally mounted on said inner surface of said barrel, said channels having a trough-shape with said set of teeth formed on opposite free edges thereof, the sets of teeth of each channel being engaged with complementary sets of teeth of adjacent channels.

5. A homokinetic joint according to claim 4, wherein each channel comprises an arch portion defining an outer surface having a radius of curvature, and an adjacent zone of said inner surface of the barrel having a radius of curvature greater than radius of curvature of said outer surface of said arch portions.

6. A homokinetic joint according to claim 5, comprising, between said outer surface of each said arch portion and said inner surface of the barrel, a pivot of cylindrical shape having an axis parallel to the axis of the barrel.

7. A homokinetic joint according to claim 5, wherein said outer surface of said arch portion of each channel includes splines and said inner surface of the barrel includes conjugate splines which are cooperative with said splines of said outer surface of said arch portions.

8. A homokinetic joint according to claim 7, wherein said splines have a slightly helical shape.

9. A homokinetic joint according to claim 7, wherein said splines are in engagement with each other along only a portion of a length of each channel confronting the inner surface of the barrel.

10. A homokinetic joint according to claim 9, comprising at least one smooth bearing zone between each channel and the inner surface of the barrel.

11. A homokinetic joint according to claim 9, wherein said splines of said barrel and a respective channel are interengaged only in two zones in the vicinity of confronting end portions of the channel and barrel, and said splines have in said two zones a slightly helical shape with opposed pitches.

12. A homokinetic joint according to claim 1, wherein said first element comprising said means defining said four pairs of rolling tracks includes a cylindrical barrel which includes four pairs of fixed rolling tracks, and said second element comprises a shaft having an end portion on which said four trunnions are pivotally mounted thus comprising said pivotable members, each trunnion carrying in the vicinity of a radially inner end thereof said set of teeth engaged with said complementary set of the teeth of adjacent trunnions.

13. A homokinetic joint according to claim 12, wherein said shaft comprises an enlarged portion which is hollow and defines therein a cross-shaped cavity having branches extending therethrough, one of said trunnions being pivotally mounted in each of the branches of said cross-shaped cavity by means comprising a pin having a central axis parallel to a central axis of said shaft and extending in bores respectively provided in said enlarged portion and in each respective trunnion.

14. A homokinetic joint according to claim 12, wherein said shaft includes an enlarged portion and a cover is angularly and axially fixed in position on said enlarged portion, the enlarged portion and the cover defining a housing for receiving said radially inner end of each trunnion and each trunnion comprising on each side of said radially inner end a laterally projecting portion provided with a set of radially outwardly oriented teeth and complementary sets of radially inwardly oriented teeth are respectively provided on said enlarged portion and said cover and are cooperative with said sets of radially outwardly oriented teeth of said trunnions.

15. A homokinetic joint according to claim 12, wherein each trunnion is pivotally mounted on a support therefor to pivot about a pivot pin which is radially outwardly offset relative to a center of the associated roller.

16. A homokinetic joint according to claim 15, wherein each trunnion has in the vicinity of an end thereof which is the closer to the axis of the joint a radial flange on which are defined said set of teeth cooperative with a respective set of teeth of an adjacent trunnion.

17. A homokinetic joint according to claim 15, wherein each pivot pin is received in a cylindrical cavity of said spider element and has at each end a V-shaped portion, and flanks of a notch having a complementary profile provided in the respective trunnion are cooperative with said V-shaped portion.

18. A homokinetic joint according to claim 15, wherein said support comprises a spider element having radially extending branches, each trunnion being hollow and pivotally mounted adjacent to an end portion of a respective one of said branches of the spider element which extends inside said trunnion.

19. A homokinetic joint according to claim 18, wherein each trunnion has in the vicinity of an end thereof which is the closer to the axis of the joint a radial flange on which are defined said set of teeth cooperative with a respective set of teeth of an adjacent trunnion.

20. A homokinetic joint according to claim 18, wherein each pivot pin is received in cylindrical cavities respectively provided in said spider element and the respective trunnion.

21. A homokinetic joint according to claim 20, wherein the transmission of forces in the direction of the axis of the pivot pin occurs between the end of each branch of said spider element and adjacent portions of an inner surface of the respective trunnion.

22. A homokinetic joint according to claim 21, wherein the end portion of each branch of said spider element and adjacent portions of the respective trunnion have confronting planar surfaces which are perpendicular to said pivot pin.

23. A homokinetic joint according to claim 21, wherein an end portion of each branch of said spider element has at least one portion of spherical shape in contact with a portion having a cylindrical surface of the respective trunnion.

24. A homokinetic joint according to claim 1, the joint being a slidable joint and including axially retaining means for said two elements.

25. A homokinetic joint according to claim 1, wherein said rolling tracks have a toric shape centered on a centre of the joint.

26. A homokinetic joint according to claim 1, in combination with a second identical homokinetic joint having a member which is common to the two joints and defines said rolling tracks, said joint further comprising a disc, means for guiding said disc so that it is perpendicular to the axis of said common member, and swivel joint means connecting adjacent ends of said elements comprising said means defining said trunnions to said disc.

27. A homokinetic transmission joint comprising a first element comprising means defining four pairs of rolling tracks of circular cross-sectional shape and a second element comprising means defining four radially extending trunnions, and four rollers of spherical shape rotatively and slidably mounted on the trunnions and receved in the pairs of rolling tracks, said first and second elements having respective axes of rotation whih may be angularly offset with respect to each other, each pair of rolling tracks and a respective trunnion forming a rolling track-trunnion pair of members, one of said members of each pair being mounted relative to said element with which it is associated in such manner as to be pivotable about only a single axis at any given moment which is parallel to said axis of rotation of said associated element and which is radially offset relative to a center of the corresponding roller, each pivotable member comprising sets of teeth engaged with complementary sets of teeth of adjacent pivotable members, the sets of teeth of each pivotable member being adapted to achieve a conjugate pivotal movement of the pivotable members.

* * * * *